United States Patent
Pluta et al.

(10) Patent No.: US 9,758,061 B2
(45) Date of Patent: Sep. 12, 2017

(54) LONGITUDINALLY ADJUSTABLE VEHICLE SEAT

(71) Applicant: JOHNSON CONTROLS COMPONENTS GMBH & CO. KG, Kaiserslautern (DE)

(72) Inventors: Wolfgang Pluta, Heiligenmoschel (DE); Thomas Dill, Heiligenmoschel (DE); Christian Wolf, Katzenbach (DE); Thomas Christoffel, Herschweiler-Pettersheim (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 40 days.

(21) Appl. No.: 14/787,945

(22) PCT Filed: Apr. 9, 2014

(86) PCT No.: PCT/EP2014/057198
§ 371 (c)(1),
(2) Date: Oct. 29, 2015

(87) PCT Pub. No.: WO2014/177351
PCT Pub. Date: Nov. 6, 2014

(65) Prior Publication Data
US 2016/0107545 A1    Apr. 21, 2016

(30) Foreign Application Priority Data

Apr. 30, 2013 (DE) .................. 10 2013 207 945
Jul. 19, 2013 (DE) .................. 10 2013 214 175

(51) Int. Cl.
*B60N 2/08* (2006.01)
*B60N 2/07* (2006.01)
(Continued)

(52) U.S. Cl.
CPC ............ *B60N 2/0727* (2013.01); *B60N 2/06* (2013.01); *B60N 2/07* (2013.01); *B60N 2/0705* (2013.01);
(Continued)

(58) Field of Classification Search
CPC ...... B60N 2/0818; B60N 2/085; B60N 2/123; B60N 2/0831; B60N 2/0837; B60N 2/0881
See application file for complete search history.

(56) References Cited

U.S. PATENT DOCUMENTS 3,228,732 A * 1/1966 Peras .................. B60N 2/06
                                              248/429
5,918,846 A * 7/1999 Garrido .............. B60N 2/123
                                              248/424
(Continued)

FOREIGN PATENT DOCUMENTS

DE         100 20 923 A1   12/2001
DE     10 2004 049 404 A1    4/2006
(Continued)

*Primary Examiner* — Bradley Duckworth
(74) *Attorney, Agent, or Firm* — McGlew and Tuttle, P.C.

(57) ABSTRACT

A longitudinally adjustable vehicle seat (1) includes a lower rail (5) and a longitudinally displaceably guided upper rail. A lower rail mounted end stop (40, 40b) delimits a comfort adjustment region interacting with an upper rail mounted stop element (36). The upper stop element (36) can be displaced beyond the comfort adjustment region into an easy entry region and is part of a stop module (30) that is pivotable about a pivot axis (S). The stop module (30) includes a deflector element (34) that moves upwards, when the stop element (36) has not been shifted away, in the vertical direction upon contact with a screw head (22) that is located in the cavity between the upper rail (3) and the
(Continued)

lower rail (5). The upper stop element (36) form-fittingly engages with the end stop (40, 40*b*) when the end stop (40, 40*b*) is reached.

20 Claims, 7 Drawing Sheets

(51) Int. Cl.
    *B60N 2/06* (2006.01)
    *B60N 2/12* (2006.01)
    *B60N 2/20* (2006.01)
(52) U.S. Cl.
    CPC .............. *B60N 2/123* (2013.01); *B60N 2/20* (2013.01); *B60N 2/206* (2013.01)

(56) References Cited

U.S. PATENT DOCUMENTS

| | | | | |
|---|---|---|---|---|
| 7,717,490 B2 * | 5/2010 | Kojima | ................ | B60N 2/0705 296/65.13 |
| 7,971,920 B2 * | 7/2011 | Jang | ........................ | B60N 2/123 296/65.01 |
| 8,201,798 B2 * | 6/2012 | Nihonmatsu | ........ | B60N 2/0705 248/430 |
| 8,393,591 B2 * | 3/2013 | Mizuno | ................ | B60N 2/0705 248/424 |
| 8,474,777 B2 * | 7/2013 | Nihonmatsu | ........ | B60N 2/0705 248/424 |
| 8,490,941 B2 * | 7/2013 | Mizuno | ................ | B60N 2/0705 248/429 |
| 8,540,203 B2 * | 9/2013 | Ruess | .................... | B60N 2/067 248/421 |
| 9,050,909 B2 * | 6/2015 | Rohnert | ............... | B60N 2/0831 |
| 9,108,535 B2 * | 8/2015 | Teufel | .................. | B60N 2/0727 |
| 9,145,069 B2 * | 9/2015 | Yamada | ................... | B60N 2/07 |
| 9,308,834 B2 * | 4/2016 | Tame | .................. | B60N 2/0818 |
| 2008/0143160 A1 * | 6/2008 | Schmale | .................. | B60N 2/20 297/344.1 |
| 2012/0168595 A1 | 7/2012 | Gray et al. | | |
| 2014/0353454 A1 * | 12/2014 | Yamada | ............... | B60N 2/0705 248/430 |

FOREIGN PATENT DOCUMENTS

DE      10 2011 011 766 A1    8/2012
WO          2012/084116 A1    6/2012

* cited by examiner

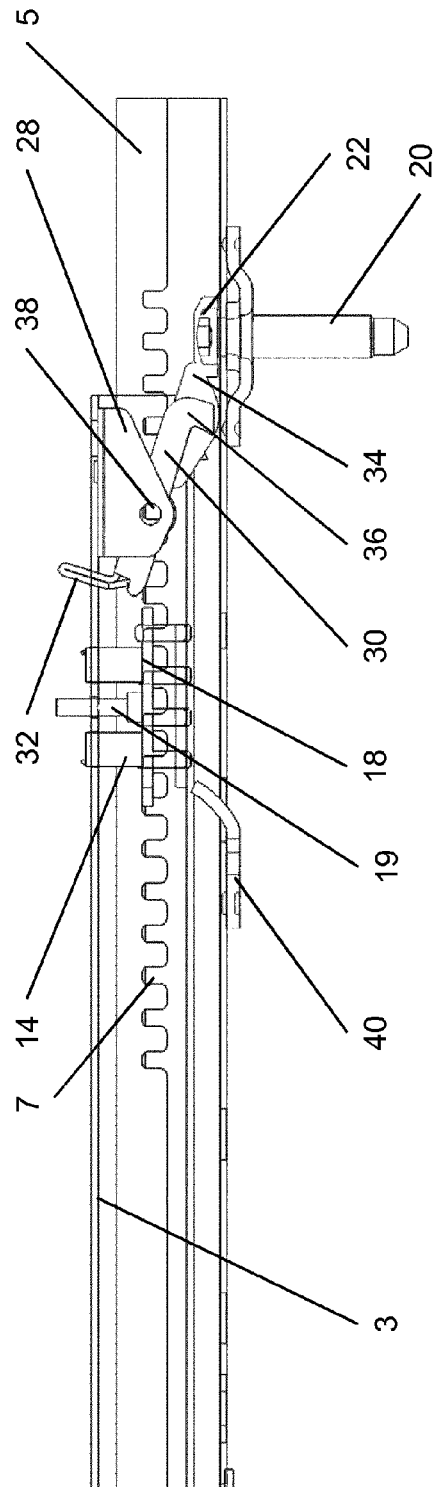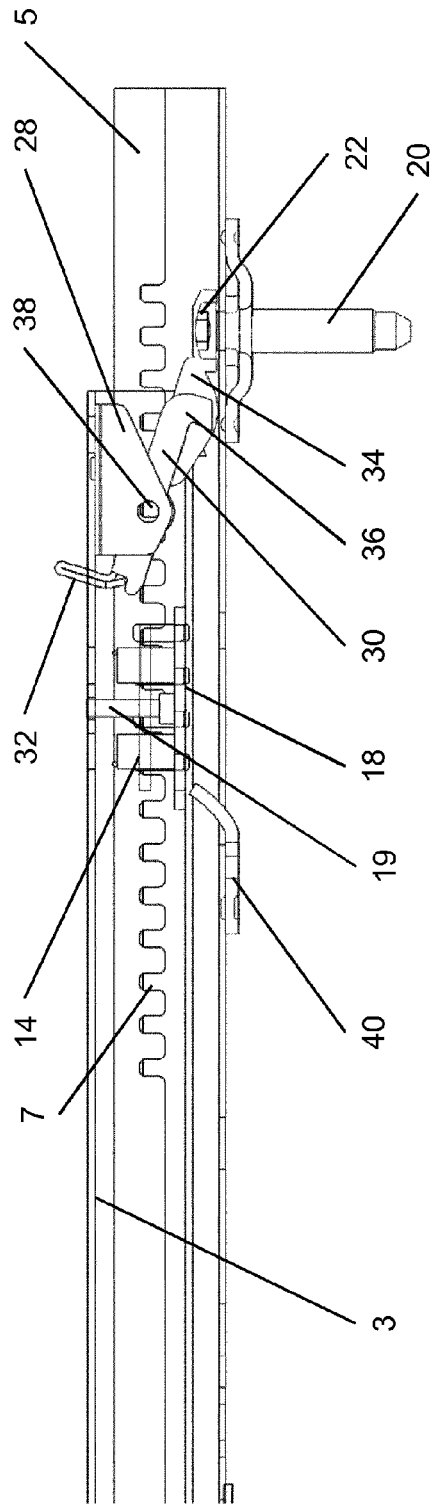
Fig. 5
Fig. 6

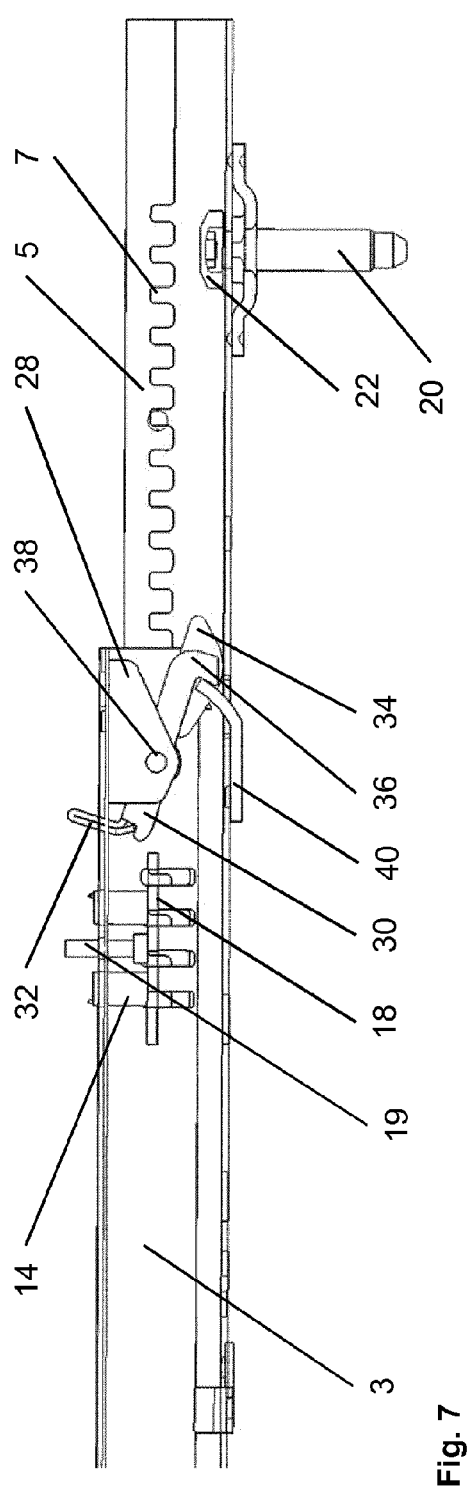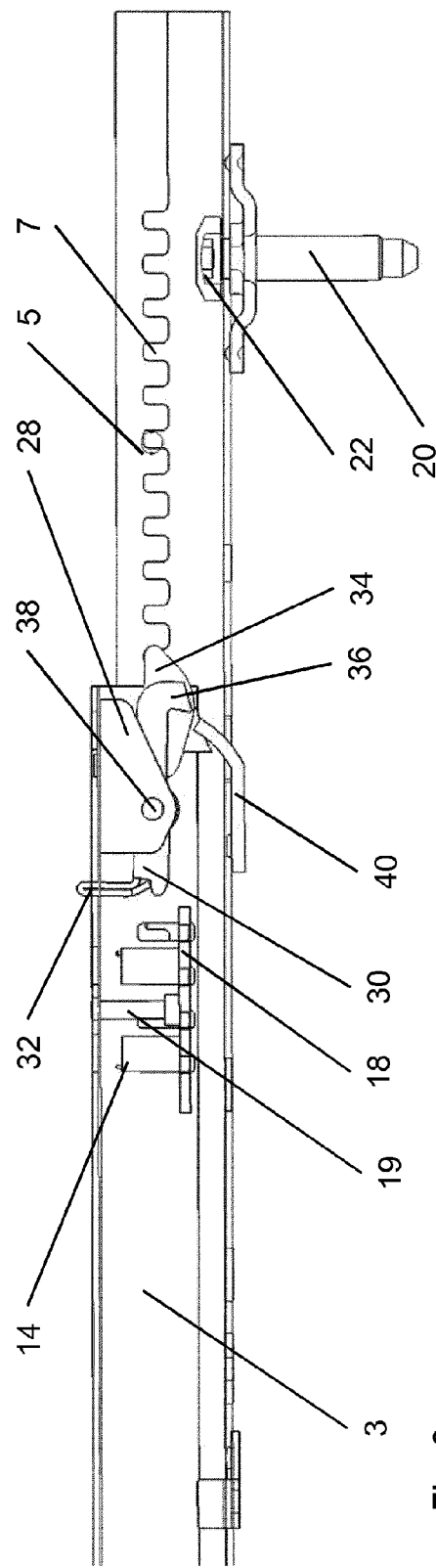

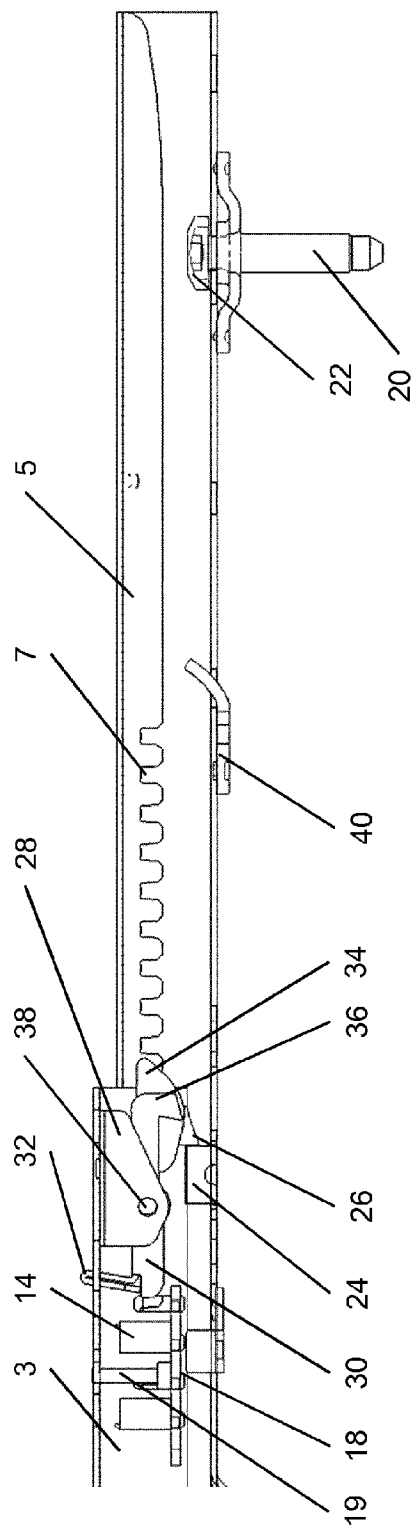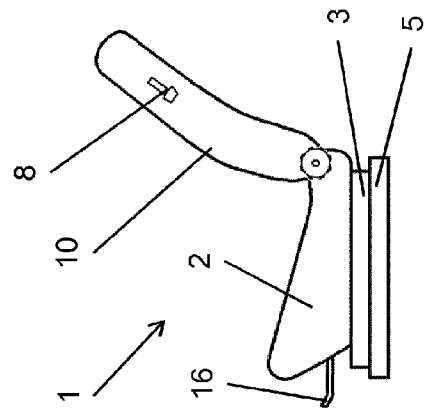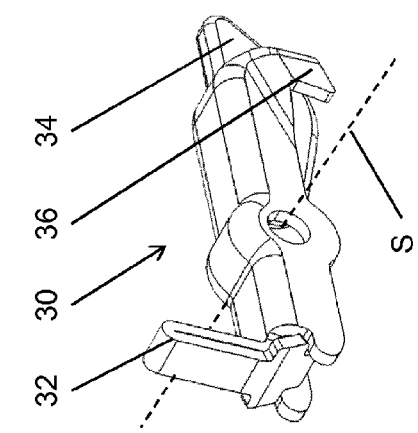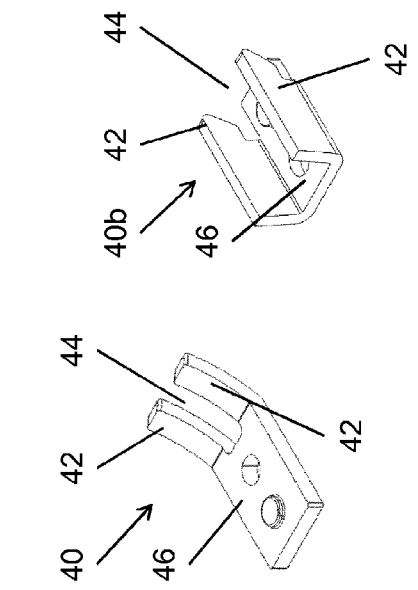
Fig. 9
Fig. 10a
Fig. 10b
Fig. 11
Fig. 12

LONGITUDINALLY ADJUSTABLE VEHICLE SEAT

CROSS REFERENCE TO RELATED APPLICATIONS

This application is a United States National Phase Application of International Application PCT/EP2014/057198 filed Apr. 9, 2014 and claims the benefit of priority under 35 U.S.C. §119 of German Patent Applications 10 2013 207 945.1 filed Apr. 30, 2013 and 10 2013 214 175.0 filed Jul. 19, 2013 the entire contents of which are incorporated herein by reference.

FIELD OF THE INVENTION

The invention relates to a longitudinally adjustable vehicle seat having a lower rail and an upper rail which can be displaceably guided therein in the longitudinal direction within a comfort adjustment region, as well as an end stop which is mounted on the lower rail and which delimits the comfort adjustment region by cooperating with a stop element mounted on the upper rail, wherein by shifting the stop element away the upper rail is able to be displaced beyond the comfort adjustment region into an easy entry region.

BACKGROUND OF THE INVENTION

A generic vehicle seat is disclosed in WO 2012/084116 A1. The vehicle seat comprises a longitudinal adjuster with two rail pairs, with in each case two seat rails which are displaceable relative to one another, namely an upper rail and a lower rail which mutually encompass one another. The upper rail is able to be displaced relative to the lower rail within a comfort adjustment region and also into an easy entry region. A locking device is provided for locking the upper rail to the lower rail in a position within the comfort adjustment region.

For limiting the comfort adjustment region an end stop element with a movable stop surface is provided on the upper rail, the stop surface cooperating with an end stop arranged on the lower rail. For displacement of the lower rail out of the comfort adjustment region into the easy entry region, the end stop element is able to be shifted away from the movable stop surface.

A generic vehicle seat is also disclosed in US 2012/0168595 A1, the vehicle seat comprising a lower rail with an end stop and an upper rail with a stop element. The stop element and the end stop in this case limit a comfort adjustment region. The stop element is able to be shifted away by pivoting about an axis, whereby the upper rail is able to be displaced beyond the comfort adjustment region into an easy entry region.

A vehicle seat is disclosed in DE 10 2004 049 404 A1 which is able to be adjusted in a comfort adjustment region and in an easy entry region. In this case a cam is attached to the upper rail, the cam cooperating with a stop strip fixed to the lower rail for limiting the comfort adjustment region.

A vehicle seat is disclosed in DE 10 2011 011 766 A1 which is able to be adjusted in a comfort adjustment region and in an easy entry region. In this case, the comfort adjustment region is limited by means of a stop which is able to be shifted away.

SUMMARY OF THE INVENTION

An object of the invention is to improve a vehicle seat of the type mentioned in the introduction, in particular to avoid collisions of a stop element fixed to the upper rail with obstructions which are located in the cavity between the upper rail and the lower rail.

A generic longitudinally adjustable vehicle seat comprises a lower rail and an upper rail which can be displaceably guided therein in the longitudinal direction, within a comfort adjustment region, as well as an end stop which is mounted on the lower rail and which delimits the comfort adjustment region by cooperating with a stop element mounted on the upper rail, wherein by shifting the stop element away the upper rail is able to be displaced beyond the comfort adjustment region into an easy entry region, and wherein the stop element is part of a stop module which can be pivoted about a pivot axis.

According to the invention, it is provided in this case that the stop module comprises a deflector element, wherein the stop module is configured such that when the stop element has not been shifted away, the deflector element moves upward in the vertical direction upon contact with a screw head which is located in the cavity between the upper rail and the lower rail, and the stop element acts positively on the end stop when the end stop is reached.

As a result, the stop element overcomes obstructions, in particular screw heads, which are located in the cavity between the upper rail and the lower rail, but nevertheless cooperates with the end stop attached to the lower rail for limiting the comfort adjustment region.

Advantageously, the stop element encompasses the deflector element on both sides with one respective stop region which is configured to be hook-shaped. As a result, the stop module in the transverse direction is designed to be mirror-symmetrical, whereby forces occurring when the end stop is acted upon are uniformly distributed.

According to an advantageous embodiment of the invention, the end stop has two stop arms arranged offset relative to one another in the transverse direction, a slot being formed therebetween. As a result, the end stop in the transverse direction is configured to be mirror-symmetrical, whereby forces occurring when the stop element is acted upon are uniformly distributed.

Preferably, when the stop element is not shifted away, the deflector element penetrates the slot of the end stop when the end stop is reached.

The stop module preferably has an actuating element which penetrates the upper rail for activating, i.e. for shifting away, the stop element.

Preferably, the stop module is designed in the form of a rocker, wherein the deflector element and the stop element are arranged on one side of the pivot axis and wherein the actuating element is arranged on the other side of the pivot axis.

The activation of the stop module is relatively simple if by pressing on the actuating element the stop module is pivoted about the pivot axis, whereby the stop element is shifted away.

According to an advantageous development of the invention, a ramp element arranged on a control arm of an activating element is provided for activating the actuating element by means of pressure, the ramp element having an outer contour which extends in an inclined manner relative to the control arm and which acts on the actuating element.

Preferably, a spring element is also provided, the spring element pivoting the stop module back about the pivot axis after release of the actuating element.

The deflector element advantageously has a front oblique portion extending in an inclined manner relative to the vertical direction and in an inclined manner relative to the longitudinal direction and/or a rear oblique portion extending in an inclined manner relative to the vertical direction and in an inclined manner relative to the longitudinal direction.

The deflector element preferably extends in the vertical direction deeper than the stop element. Thus, only the deflector element comes into contact with a screw head, whilst the stop element remains at a distance from the screw head.

The production of the stop module is relatively simple if the deflector element and the stop element are configured in one piece.

Preferably, in this case the deflector element, the stop element and the actuating element are configured in one piece.

The invention is described in more detail hereinafter with reference to an advantageous exemplary embodiment shown in the drawings. The invention is, however, not limited to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a lateral sectional view of the rail pair in a front adjusted position in the locked state;

FIG. 6 is a lateral sectional view of the rail pair in a front adjusted position in the unlocked state;

FIG. 7 is a lateral sectional view of the rail pair in the front end position;

FIG. 8 is a lateral sectional view of the rail pair in the transfer position;

FIG. 9 is a lateral sectional view of the rail pair in the easy entry position;

FIG. 10a is a perspective view of an end stop;

FIG. 10b is a perspective view of an end stop according to a modified embodiment;

FIG. 11 is a perspective view of a stop module;

FIG. 12 is a schematic view of a vehicle seat;

DESCRIPTION OF THE PREFERRED EMBODIMENTS

Figure 1:
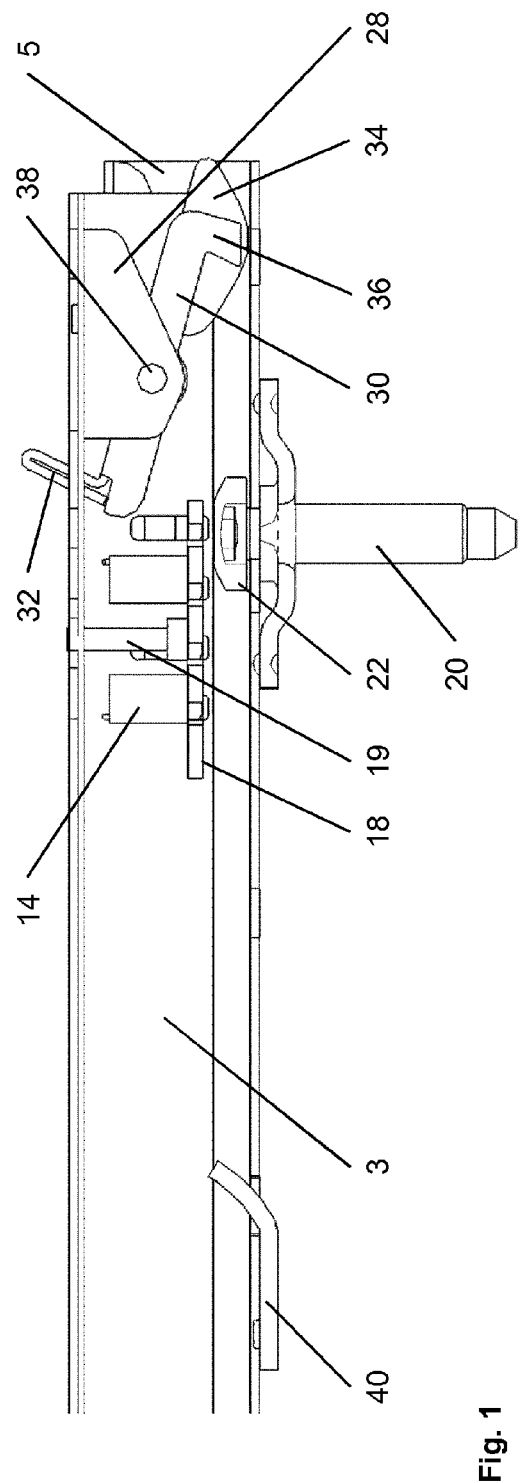
FIG. 1 is a lateral sectional view of a rail pair of a longitudinal adjuster of a vehicle seat in a rear adjusted position.

A vehicle seat 1 for a three-door motor vehicle in the present case, in this case a front seat, has a seat part 2 and a backrest 10 which is attached thereto and which is able to be adjusted in inclination. The vehicle seat could, however, also be a rear seat, in particular in a five-door motor vehicle with three seat rows and seven vehicle seats.

The arrangement of the vehicle seat 1 inside the vehicle and the usual direction of travel thereof define the directional information used hereinafter. In this case, a direction oriented perpendicular to the ground is denoted hereinafter as the vertical direction and a direction perpendicular to the vertical direction and perpendicular to the direction of travel is denoted hereinafter as the transverse direction.

By means of a longitudinal adjuster which has two lower rails 5 connected to the vehicle floor of the motor vehicle and two upper rails 3, the vehicle seat 1 is able to be longitudinally adjusted within a comfort region. This means that the seat part 2 together with the backrest 10 are able to be adjusted in the longitudinal direction, which in the present case corresponds approximately to the direction of travel. To this end, each of the upper rails 3 is displaceably guided, respectively in one of the lower rails 5 extending parallel in the longitudinal direction.

Each of the two upper rails 3 in each case forms a seat rail pair with the associated lower rail 5. The longitudinal adjuster thus comprises two seat rail pairs arranged offset relative to one another in the transverse direction and extending parallel to one another. The upper rail 3 and the lower rail 5 mutually encompass one another, wherein in each case a cavity is produced between the upper rail 3 and the lower rail 5.

By means of one respective locking device 14 which is arranged in such a cavity, each of the two upper rails 3 is able to be locked to the respective lower rail 5. The locking devices 14 are able to be unlocked by means of an unlocking lever 16 which in the present case is arranged in the direction of travel at the front on the vehicle seat 1, whereby the vehicle seat 1 is able to be displaced in the longitudinal direction.

The two seat rail pairs in the present case are constructed mirror-symmetrically to one another. Therefore, details will be provided hereinafter of only one seat rail pair of the longitudinal adjuster.

The lower rail 5 is fastened by means of a fastening screw 20, amongst other things, to the floor structure of the vehicle. The fastening screw 20, in this case with its shank, penetrates the lower rail 5 in the vertical direction and is screwed into a corresponding thread on the floor structure of the vehicle. The fastening screw 20 has a screw head 22 which is located in the vertical direction above the shank and protrudes into the cavity between the upper rail 3 and the lower rail 5. The fastening screw 20 is located in a rear region of the lower rail 5 in the longitudinal direction.

The locking device 14 comprises a locking plate 18 which is movable in the vertical direction, the locking plate having locking teeth protruding in the transverse direction. The locking plate 18 is attached to the upper rail 3 by means of locking springs, not shown. The locking springs in this case pull the locking plate 18 upwardly in the vertical direction.

A cylindrical unlocking pin 19 is attached to the locking plate 18, the central axis of the unlocking pin extending in the vertical direction. The unlocking pin 19 penetrates an opening in the upper rail 3 which represents a guide for the unlocking pin 19.

The lower rail has in the vertical direction downwardly open notches 7. In the locked state of the rail pair, the locking plate 18 is in an upper position and the locking teeth of the locking plate 18 engage in the notches 7. For the unlocking process, an unlocking element 17 actuated by the release lever 16 presses the unlocking pin 19 downwardly, whereby the locking plate 18 is also pressed downwardly into a lower position. As a result, the locking teeth of the locking plate 18 move downwardly out of the notches 7. The rail pair is then unlocked and the upper rail 3 is able to be moved relative to the lower rail 5 in the longitudinal direction within the comfort adjustment region.

Moreover, the vehicle seat 1 has an easy entry function. For facilitating the entry to a rear seat, the upper rail 3 may be displaced forward relative to the lower rail 5 beyond the comfort region into an easy entry region. The easy entry function is activated by actuating an operating lever 8.

In a rear region in the longitudinal direction, in particular to the rear of the locking device 14, a stop module 30 is attached to the upper rail 3 and approximately entirely in the cavity between the upper rail 3 and the lower rail 5. The stop module 30 in the present case is configured in the form of a rocker and is pivotable about a pivot axis S extending in the transverse direction. The pivot axis S is defined by a cylindrical bearing pin 38, which is mounted in a retaining plate 28 which is fastened to the upper rail 3.

The retaining plate 28 is located inside the cavity between the upper rail 3 and the lower rail 5 and has an approximately U-shaped profile, wherein the base of the profile extends horizontally and is fastened to the upper rail 3. Two limbs which extend downwardly in the vertical direction protrude at right angles from the base.

The bearing pin 38 is mounted in bores in the limbs of the retaining plate 28 provided therefor. In addition to the mounting of the bearing pin 38, the retaining plate 28 additionally serves for reinforcing the upper rail 3. The retaining plate 28, however, may also be dispensed with and the bearing pin 38 may be fastened directly to the upper rail 3.

In the longitudinal direction to the front, the stop module 30 has an actuating element 32 which penetrates the upper rail 3 upwardly through an opening provided therefor. In the longitudinal direction to the rear, the stop module 30 has a deflector element 34 and a stop element 36. The deflector element 34 is arranged centrally inside the stop element 36 in the transverse direction. The stop element 36 thus encompasses the deflector element 34 on both sides with one respective stop region which is configured to be hook-shaped.

The deflector element 34, on the side facing the bearing pin 38, has a front oblique portion extending upwardly and to the front in an inclined manner relative to the vertical direction and in an inclined manner relative to the longitudinal direction. On the side remote from the bearing pin 28, the deflector element 34 has a rear oblique portion extending upwardly and to the rear in an inclined manner relative to the vertical direction and in an inclined manner relative to the longitudinal direction. The deflector element 34 extends in the vertical direction at least as far as, in the present case deeper than, the stop regions of the stop element 36.

When actuating the operating lever 8 and pivoting the backrest 10 relative to the seat part 2, the actuating element 32 is pressed downwardly by an activating element 50 in the vertical direction. In this case, the stop module 30 performs a pivoting motion about the pivot axis S defined by the bearing pin 38, whereby the deflector element 34 and the stop element 36 move upwardly. When actuating the operating lever 8 and pivoting the backrest 10 relative to the seat part 2, the locking device 14 is also unlocked.

If the actuating element 32 is released, a spring element, not shown, pivots the stop module 30 about its pivot axis S back into the initial position. In this case, the actuating element 32 moves upwardly and the deflector element 34 and the stop element 36 move downwardly. The spring element is preferably configured as a torsion spring and arranged around the bearing pin 38. However, other embodiments of the spring element, for example a spiral spring or a leg spring, are conceivable.

An end stop 40 is arranged on the lower rail 5 in the longitudinal direction in front of the fastening screw 20. The end stop 40 comprises a base plate 46 which is fastened to the lower rail 5, as well as two stop arms 42 which are arranged offset relative to one another in the transverse direction and which extend parallel to one another. A slot is formed 44 between the two stop arms 42. Such an end stop 40 is shown in FIG. 10*a*.

In FIG. 10*b*, an end stop according to a modified embodiment 40*b* is shown, the end stop being of U-shaped design in cross section. In this case, the base of the U-shaped cross section forms the base plate 46 which is fastened to the lower rail 5 and the arms of the U-shaped cross section form the stop arms 42. In this case, the stop arms 42 extend, for example, parallel to one another upwardly in the vertical direction or slightly inclined relative to one another and in an inclined manner relative to the vertical direction. The slot 44 is formed between the two stop arms 42.

In the present case, the base plate 46 of the end stop 40 is arranged below the lower rail 5 and the stop arms 42 protrude through an opening provided therefor in the lower rail 5 into the cavity between the upper rail 3 and the lower rail 5. In this case, the stop arms 42, starting on the base plate 46, extend in an inclined manner relative to the vertical direction and in an inclined manner relative to the longitudinal direction, upwardly and to the rear.

The stop arms 42 of the end stop 40 extend in this case upwardly in the vertical direction only sufficiently far that the locking plate 18 is still located above the stop arms 42, even in its lower position. Thus, a collision of the locking plate 18 with the stop arms 42 is reliably avoided during a displacement of the upper rail 3 relative to the lower rail 5.

In the view shown in FIG. 1, the rail pair is located in the comfort region in a rear adjusted position. The deflector element 34 of the stop module 30 in this case is located in the longitudinal direction to the rear of the screw head 22 of the fastening screw 20. The easy entry function is not activated and the locking device 14 is unlocked.

Starting from the rear adjusted position shown in FIG. 1, the vehicle seat 1 is pushed to the front. At the same time, the front oblique portion of the deflector element 34 comes into contact with the screw head 22 of the fastening screw 20, which constitutes an obstruction for the stop module 30. The front oblique portion of the deflector element 34 in this case slides along the screw head 22, whereby the deflector element 34 is moved upwardly. The stop module 30 at the same time is pivoted counter to the force of the spring element about its pivot axis S.

Figure 2:
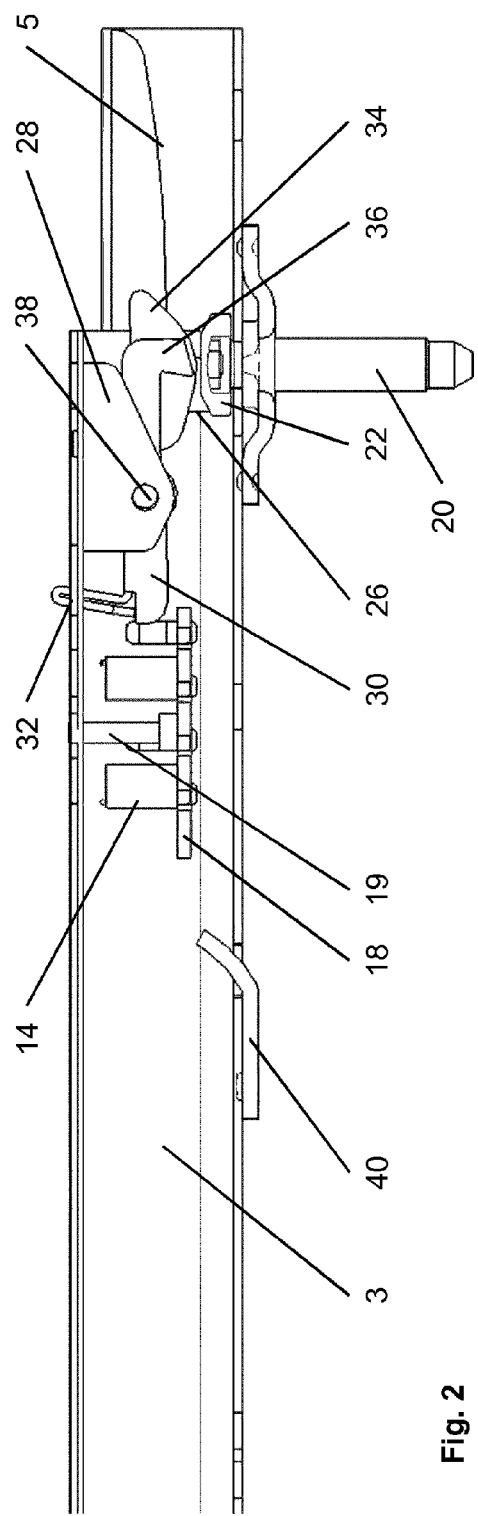
FIG. 2 is a lateral sectional view of the rail pair in a central adjusted position.
Figure 3:
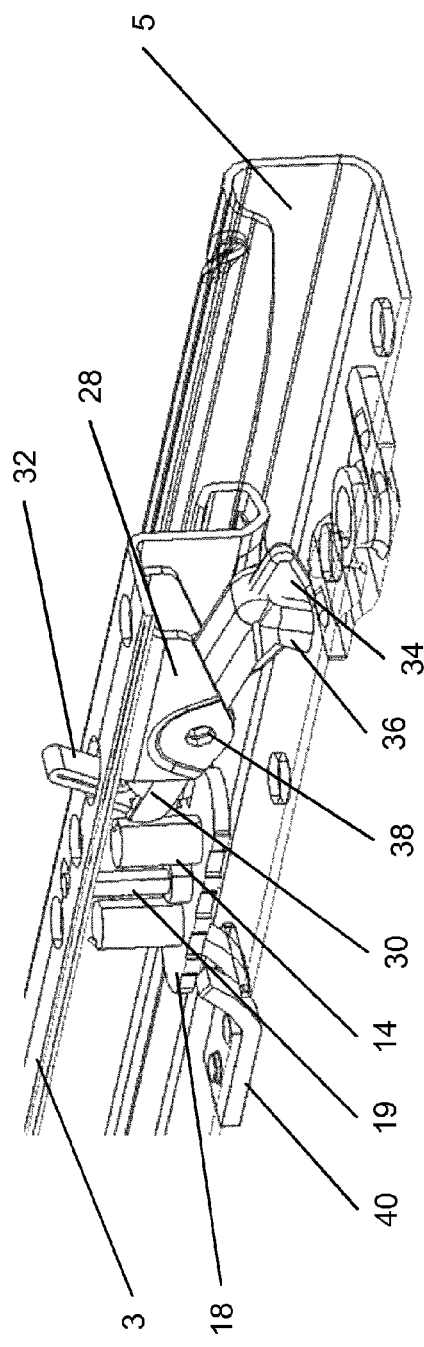
FIG. 3 is a perspective, partially sectional view of the rail pair in a front adjusted position.
Figure 4:
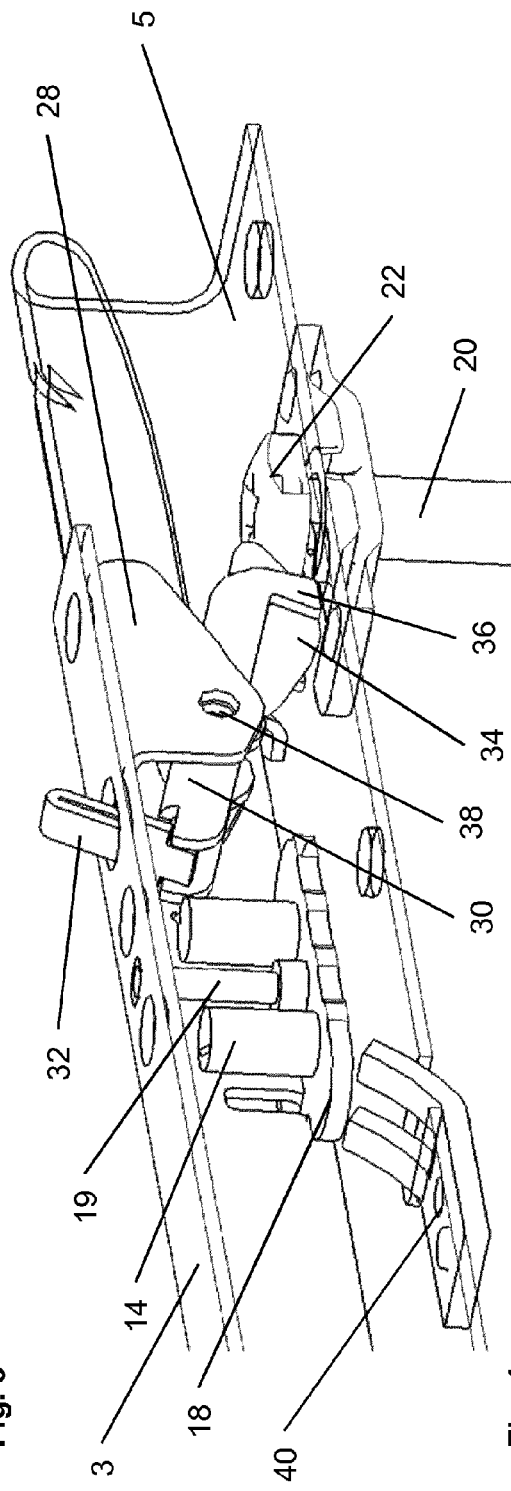
FIG. 4 is a further perspective, partially sectional view of the rail pair in a front adjusted position.

In FIG. 2, a central adjusted position is shown in which the deflector element 34 is located on the screw head 22 of the fastening screw 20.

Starting from the central adjusted position shown in FIG. 2, the vehicle seat 1 is pushed further forward. At the same time, the rear oblique portion of the deflector element 34 comes into contact with the screw head 22 of the fastening screw 20. The rear oblique portion of the deflector element 34 slides in this case along the screw head 22, whereby the deflector element 34, assisted by the force of the spring element, moves downwardly. In this case, the stop module 30 is pivoted by the force of the spring element about its pivot axis S.

The rail pair then reaches a front adjusted position which is shown in FIGS. 3 to 6 and in which the deflector element 34 is located in the longitudinal direction in front of the screw head 22 of the fastening screw 20. The easy entry function is not activated. In the view according to FIG. 5, the locking device 14 is locked. The locking plate 18 is located in the upper position.

In order to push the vehicle seat 1 further forward, starting from the view according to FIG. 5, initially the locking device 14 is unlocked, as shown in FIG. 6. In this case, the locking plate 18 is moved into the lower position. If the vehicle seat 1 is now pushed further forward, the rail pair reaches the front end position shown in FIG. 7, which limits the comfort region to the front. In this case, the stop module 30 comes into contact with the end stop 40.

In the front end position shown in FIG. 7, the deflector element 34 penetrates the slot 44 of the end stop 40, whilst the stop regions of the stop element 36, which are of hook-shaped configuration, come to bear against the stop arms 42 of the end stop 40. The stop regions of the stop element 36 and the stop arms 42 of the end stop 40 in this case are in self-locking contact with one another. A further displacement of the upper rail 3 relative to the lower rail 5 is thus not possible.

For activating the easy entry function, in a position within the comfort region, for example in the front end position shown in FIG. 7 or in the front adjusted position shown in FIG. 5 or in the central adjusted position shown in FIG. 2 or in the rear end position shown in FIG. 1, the operating lever 8 is actuated. As a result, the unlocking pin 19 of the locking device 14 and the actuating element 32 of the stop module 30 are pressed downwardly, whereby the deflector element 34 and the stop element 36 are moved upwardly and the locking device 14 is unlocked.

The stop element 36 in this case is moved sufficiently far upwardly that its hook-shaped stop regions are located above the stop arms 42 of the end stop 40 in the vertical direction. As a result, the upper rail 3 may be moved further forward relative to the lower rail 5 and the rail pair enters the easy entry region.

The contours of the stop arms 42 of the end stop 40 and the stop element 36 of the stop module 30 are designed such that self-locking contact is present in the front end position, as regards a forward displacement of the upper rail 3 relative to the lower rail 5. However, in the front end position a pivoting movement of the stop module 30 is possible about its pivot axis S, whereby the stop element 36 is moved upwardly relative to the stop arms 42.

In FIG. 8, the transfer position of the rail pair is shown in which the deflector element 34 and the stop element 36 of the stop module 30 are located precisely above the stop arms 42 of the end stop 40 in the vertical direction.

The upper rail 3 may now be displaced further forward relative to the lower rail 5 until the easy entry position of the rail pair shown in FIG. 9 is reached. In the easy entry position, a counter stop 26 configured on the upper rail 3 strikes a fixed stop 24 configured on the lower rail 5, whereby the forward travel path of the upper rail 3 is limited.

Instead of the counter stop 26, the stop element 36 of the stop module 30 may also bear against the fixed stop 24 in the easy entry position in order to limit the forward travel path of the upper rail 3 relative to the lower rail 5. In this case, the fixed stop 24 is of similar design to the described end stop 40 or the end stop according to the modified embodiment 40*b*, wherein the stop arms 42 extend sufficiently far upward in the vertical direction that the hook-shaped stop regions of the stop element 36 are not able to reach above the stop arms 42 of the end stop 40.

The stop module 30 in the present case is configured in one piece. Instead of the rigid deflector element 34 which slides over obstructions, such as for example the screw head 22, a rotating or rolling element, for example a roller, may also be provided on the stop module.

In the present exemplary embodiment, the activation of the easy entry function takes place by pressing downward in the vertical direction on the actuating element 32 of the stop module. Alternatively, a traction element, for example in the form of a Bowden cable, may also be arranged on the deflector element 34 or on the stop element 36. In this case, the activation of the easy entry function may be carried out by pulling upwardly in the vertical direction.

In the present case, the end stop 40 is configured as a separate component and fastened to the lower rail 5. It is also conceivable to configure the end stop 40 integrally with the lower rail 5, for example, by the stop arms 42 being extended out from the material of the lower rail 5 and bent upwardly.

Figure 15:
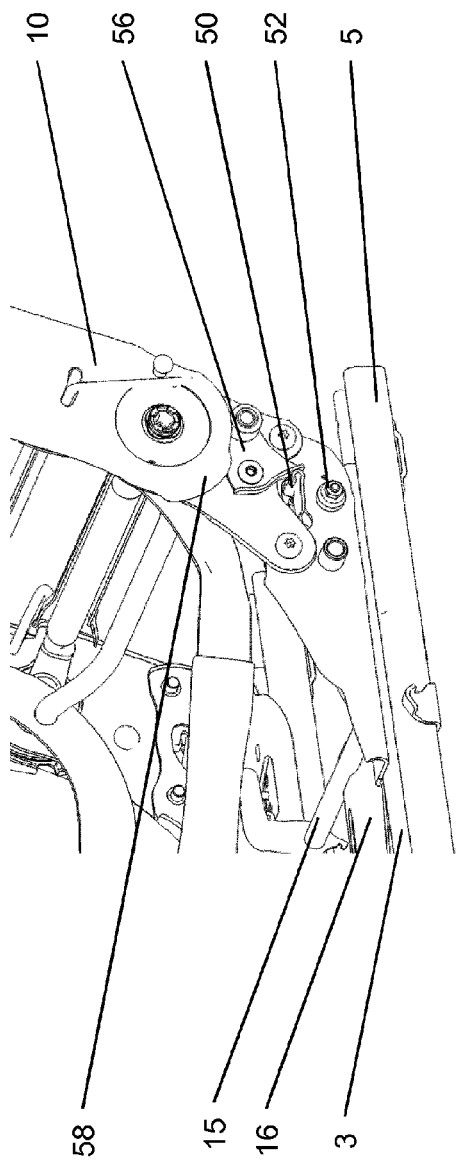
FIG. 15 is a perspective view of a structure of a vehicle seat according to the invention from the outside.
Figure 16:
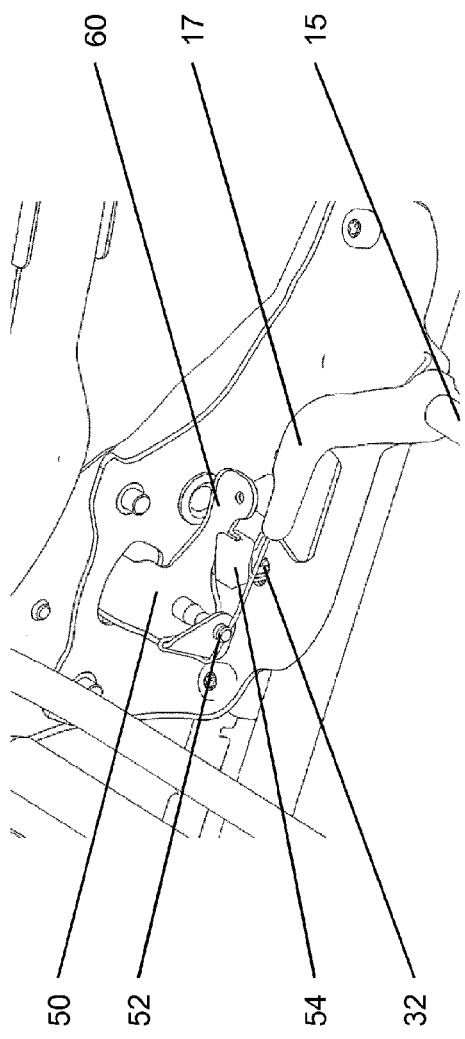
FIG. 16 is a perspective view of a structure of a vehicle seat according to the invention from the inside.

When actuating the operating lever 8 for activating the easy entry function and pivoting the backrest 10 relative to the seat part 2, a cam 58 connected fixedly in terms of rotation to the backrest 10 actuates a pivotably mounted transmission lever 56 fixed to the upper rail. The transmission lever 56 consequently actuates the activating element 50 which is also pivotably mounted and fixed to the upper rail. The arrangement of the cam 58, the transmission lever 56 and the activating element 50 is disclosed from the view according to FIG. 15.

The activating element 50 is pivotable about a pivot pin 52 relative to the seat part 2 and relative to the upper rail 3 and has a control arm 60 protruding approximately radially from the pivot pin 52. A ramp element 54 is arranged on the control arm 60, the ramp element having an outer contour which extends in an inclined manner relative to the control arm 60 and which, when activating the easy entry function, acts on the actuating element 32 of the stop module 30. The outer contour of the ramp element 54 in the present case is designed to be curved.

Figures 13, 14:
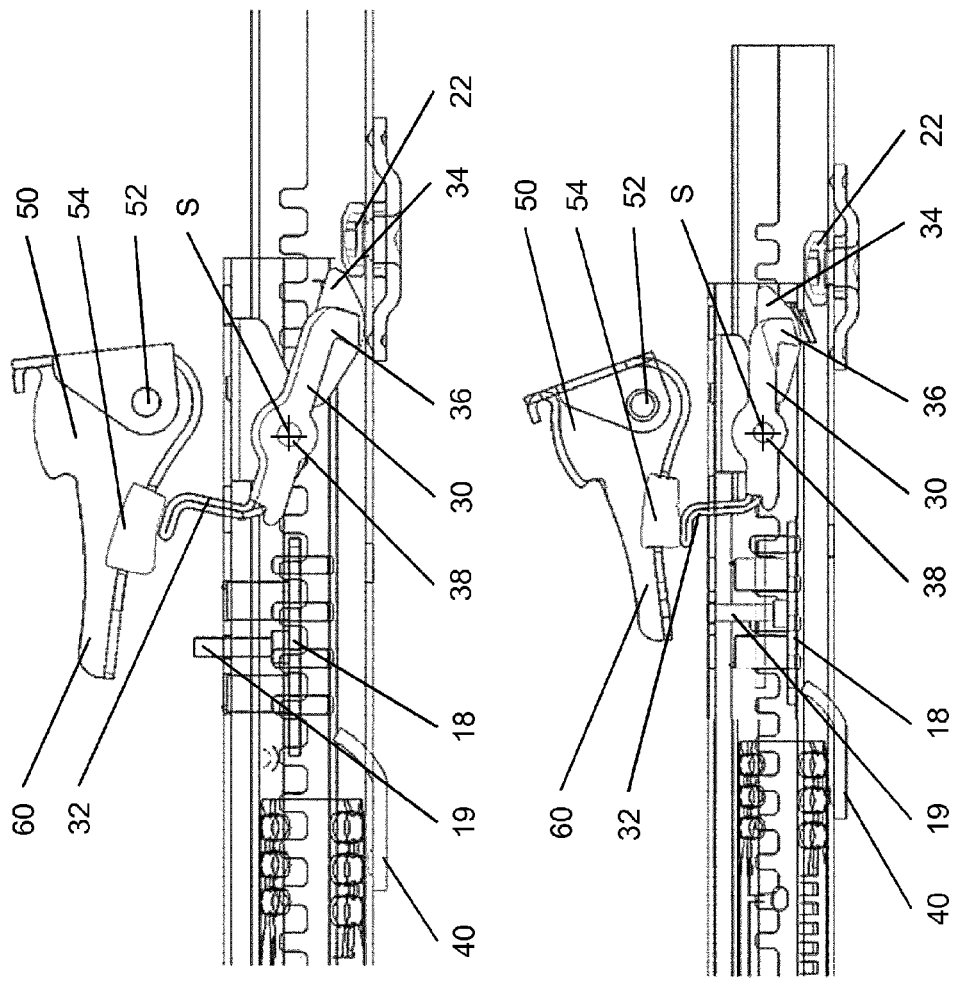
FIG. 13 is a lateral sectional view of the rail pair with a control element when the easy entry function is not activated.
FIG. 14 is a lateral sectional view of the rail pair with a control element when the easy entry function is activated.

In the views according to FIG. 13 and FIG. 14 an actuating element 32 which has been modified relative to the remaining views is shown in this case. The actuating element 32, shown in FIG. 13 and FIG. 14, has an additional tongue extending approximately in the direction of travel for cooperating with the ramp element 54.

When pivoting the backrest 10 and actuating the activating element 50 by the transmission lever 56, the control arm 60 pivots about the pivot pin 52, whereby the ramp element 54 moves downwardly, approximately in the vertical direction. In this case, the ramp element 54 presses the actuating element 32 of the stop module 30 downwardly, whereupon the stop module 30 performs a pivoting movement about the pivot axis S defined by the bearing pin 38.

The unlocking lever 16 is pivotably mounted about the unlocking shaft 15 on the upper rail 3 and is connected fixedly in terms of rotation to the unlocking shaft 15. The unlocking element 17 is also connected fixedly in terms of rotation to the unlocking shaft 15. When actuating the release lever 16, the unlocking element 17 is pivoted about the unlocking shaft 15 and as a result presses on the unlocking pin 19, whereby the locking device 14 is unlocked.

When pivoting the backrest 10 and actuating the activating element 50 by means of the transmission lever 56, the control arm 60 pivots about the pivot pin 52 and at the same time additionally presses on the unlocking element 17 which as a result presses on the unlocking pin 19, whereby the locking device 14 is unlocked. The unlocking element 17 is not shown in the views according to FIG. 13 and FIG. 14.

When actuating the operating lever 8 for activating the easy entry function and pivoting the backrest 10 relative to the seat part 2, at the same time the stop module 30 is actuated and the locking device 14 is unlocked.

The features disclosed in the above description, the claims and the drawings may be of significance both individually and in combination for implementing the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A longitudinally adjustable vehicle seat comprising:
   a lower rail; and
   an upper rail which can be displaceably guided along the lower rail in the longitudinal direction within a comfort adjustment region;
   an end stop mounted on the lower rail;
   a screw head located in a cavity between the upper rail and the lower rail; and
   a stop module comprising a stop element mounted on the upper rail, the end stop delimiting the comfort adjustment region by cooperating with the stop element mounted on the upper rail, wherein by shifting the stop element away, from a bottom of the lower rail and lifting beyond the end stop, the upper rail is able to be displaced beyond the comfort adjustment region into an easy entry region, and wherein the stop module is pivotable about a pivot axis and comprises a deflector element, wherein the stop module is configured such that when the stop element has not been shifted away from the bottom of the lower rail and lifted beyond the end stop, the deflector element moves upward in a vertical direction upon contact with the screw head which is located in the cavity between the upper rail and the lower rail, and the stop element acts positively on the end stop when the end stop is reached.

2. The vehicle seat as claimed in claim 1, wherein the stop element encompasses the deflector element in the transverse direction on both sides with one respective stop region, said stop regions being configured to be hook-shaped.

3. The vehicle seat as claimed in claim 1, wherein the end stop comprises two stop arms arranged offset relative to one another in a transverse direction, a slot being formed therebetween.

4. The vehicle seat as claimed in claim 3, wherein when the stop element is not shifted away from the bottom of the lower rail and lifted beyond the end stop, the deflector element penetrates the slot of the end stop when the end stop is reached.

5. The vehicle seat as claimed in claim 1, wherein the stop module has an actuating element which penetrates the upper rail.

6. The vehicle seat as claimed in claim 5, wherein the stop module is configured in a form of a rocker, wherein the deflector element and the stop element are arranged on one side of the pivot axis and wherein the actuating element is arranged on the other side of the pivot axis.

7. The vehicle seat as claimed in claim 5, wherein by pressing on the actuating element the stop module is pivoted about the pivot axis, whereby the stop element is shifted away from the bottom of the lower rail and lifted beyond the end stop.

8. The vehicle seat as claimed in claim 7, wherein a ramp element arranged on a control arm of an activating element is provided for activating the actuating element by means of pressure, said ramp element having an outer contour which extends in an inclined manner relative to the control arm and which acts on the actuating element.

9. The vehicle seat as claimed in claim 7, wherein a spring element is provided, said spring element pivoting the stop module back about the pivot axis after release of the actuating element.

10. The vehicle seat as claimed in claim 5, wherein the deflector element, the stop element and the actuating element are configured in one piece.

11. The vehicle seat as claimed in claim 1, wherein the deflector element has a front oblique portion extending in an inclined manner relative to the vertical direction and in an inclined manner relative to the longitudinal direction.

12. The vehicle seat as claimed in claim 1, wherein the deflector element has a rear oblique portion extending in an inclined manner relative to the vertical direction and in an inclined manner relative to the longitudinal direction.

13. The vehicle seat as claimed in claim 1, wherein the deflector element extends in the vertical direction lower than the stop element.

14. The vehicle seat as claimed in claim 1, wherein the deflector element and the stop element are configured in one piece.

15. The vehicle seat as claimed in claim 1, wherein the pivot axis extends in the transverse direction.

16. The vehicle seat as claimed in claim 1, wherein the stop element has stop regions arranged on both sides of the deflector element in a transverse direction, said stop regions being hook-shaped.

17. A longitudinally adjustable vehicle seat comprising:
    a lower rail;
    an upper rail movably mounted on said lower rail in a longitudinal direction of said rails along a comfort adjustment region and an easy entry region, said lower rail and said upper rail defining a cavity between each other;
    an end stop mounted on said lower rail;
    a stop element pivotally mounted on said upper rail about a pivot axis, said stop element delimiting said comfort adjustment region by cooperating with said end stop, said stop element being pivotal away from a first position at said lower rail to a second position beyond said end stop allowing said upper rail to be displaced from said comfort adjustment region into said easy entry region;
    an obstruction arranged on said lower rail in said comfort adjustment region, said obstruction protruding away from said lower rail toward said upper rail by a distance to block movement of said stop element toward said easy entry region when said stop element is in said first position;
    a deflector element moving said stop element from said first position to beyond said obstruction when said deflector element and said stop element move across said obstruction, said deflector element not moving said stop element from said first position when said deflector element and said stop element move across said end stop.

18. The vehicle seat as claimed in claim 17, wherein:
said end stop includes two stop arms arranged offset relative to one another in a transverse direction, said two stop arms defining a slot between said stop arms.

19. The vehicle seat as claimed in claim 17, further comprising:
an actuating element which penetrates said upper rail, pressing on said actuating element pivots said stop element about said pivot axis and away from said lower rail to beyond said end stop;
a ramp element arranged on a control arm of said activating element for activating the actuating element by means of pressure, said ramp element having an outer contour which extends in an inclined manner relative to said control arm and which acts on said actuating element.

20. The vehicle seat as claimed in claim 17, wherein:
said deflector element is arranged offset from said stop element in a transverse direction.

* * * * *